No. 630,659. Patented Aug. 8, 1899.
E. S. CLAYTON.
MEASURING AND REGISTERING DEVICE.
(Application filed June 13, 1898.)
(No Model.)
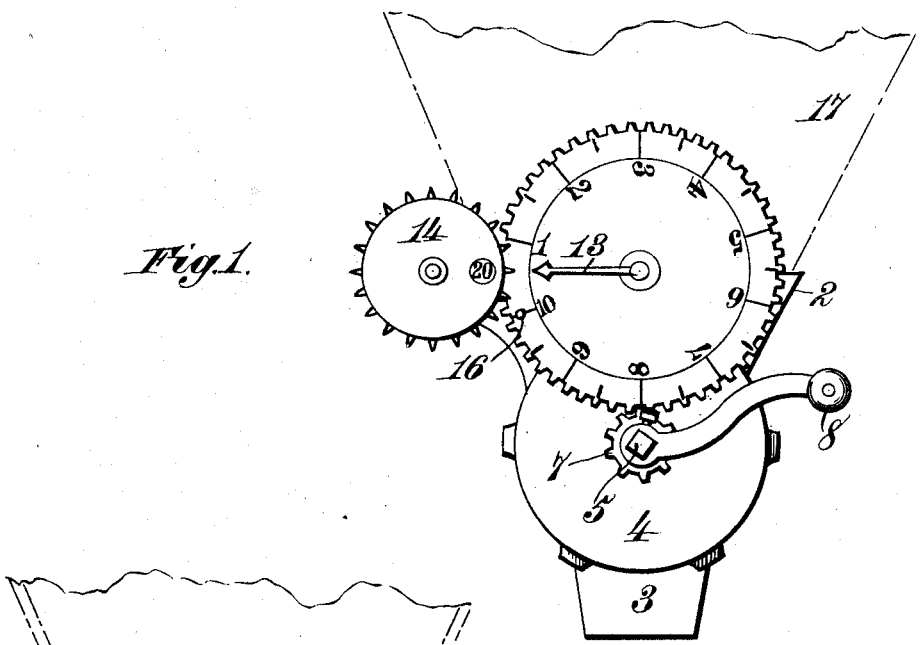
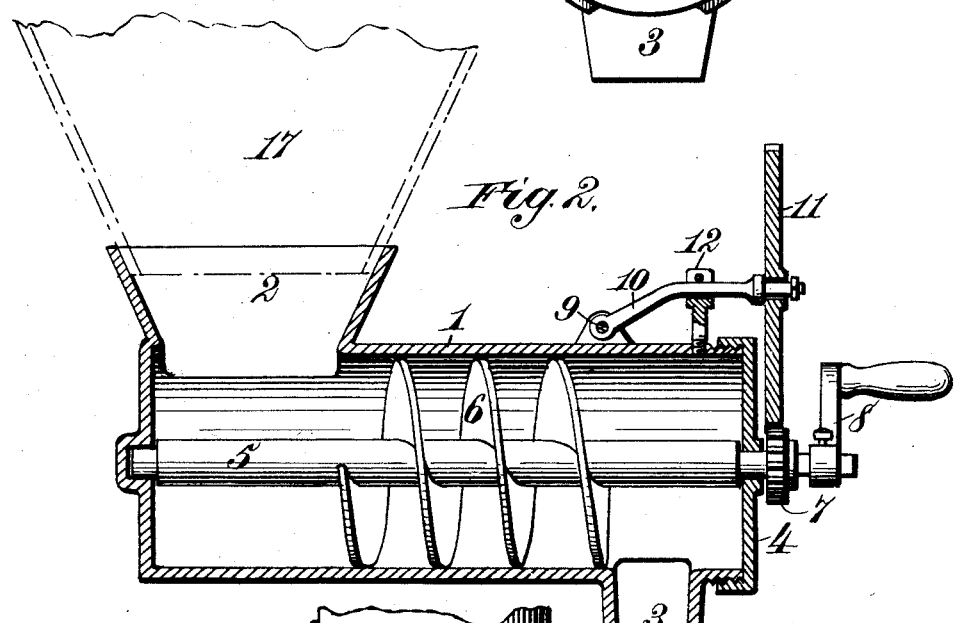
Witnesses.
Robert Everett.
Dennis Sumby.
Inventor.
Edward S. Clayton.
By James L. Norris.
Att'y.

UNITED STATES PATENT OFFICE.

EDWARD S. CLAYTON, OF CORNERSVILLE, TENNESSEE.

MEASURING AND REGISTERING DEVICE.

SPECIFICATION forming part of Letters Patent No. 630,659, dated August 8, 1899.

Application filed June 13, 1898. Serial No. 683,315. (No model.)

*To all whom it may concern:*

Be it known that I, EDWARD S. CLAYTON, a citizen of the United States, residing at Cornersville, in the county of Marshall and State of Tennessee, have invented new and useful Improvements in Measuring and Registering Machines, of which the following is a specification.

This invention relates to measuring and registering machines, and has for its object to provide improved means whereby coffee, sugar, grain, and similar dry materials may be discharged from the stock in bulk and automatically measured and the measurement indicated in pounds and decimal fractions of a pound; and to this end it consists in the novel construction, combination, and arrangement of parts hereinafter described, and particularly pointed out in the claim following the description, reference being had to the accompanying drawings, forming a part of this specification, wherein—

Figure 1 is an end elevation of a machine constructed according to my invention. Fig. 2 is a vertical longitudinal section; and Fig. 3 is a top plan view, partly broken away.

Referring to the drawings, the numeral 1 indicates a horizontal cylinder provided at one end with a feed-hopper 2 and at its other end with a discharge-spout 3. The hopper 2 should be large enough to hold a bag of coffee or a barrel of sugar, and the discharge-spout should be of sufficient capacity to freely discharge the material without any tendency of the latter to choke in the spout. The rear end of the cylinder 1 is permanently closed, and its front end is closed by a removable cap 4, which is screwed onto the threaded end of the cylinder. Journaled in the opposite ends of the cylinder 1 is a shaft 5, on which is fixed a worm 6, that is equal in diameter to the internal diameter of the cylinder. One end of the worm-shaft 5 projects through the cap 4 and has fixed thereon a pinion 7 and a crank 8. Pivotally attached to the upper side of the cylinder, as at 9, is one end of a bracket-arm 10, on the opposite end of which is journaled a gear-wheel 11. The bracket-arm 10 is adapted to rest in a forked support 12, and when seated in said support the pinion 11 is in engagement with the gear-wheel 7. By the use of said forked support I am enabled to mount the gear-wheel 11 upon a single bracket-arm 10 to prevent lateral movement of said arm and the gear-wheel carried thereby and to so support the wheel 11 with respect to the pinion 7 that binding action between the said wheel and pinion is avoided. In other words, the forked support 12 serves to prevent lateral displacement of the gear-wheel 11, as well as to prevent the weight of said wheel from coming on the pinion 7. The gear-wheel 11 is graduated into twenty parts, as shown, and an index-hand 13 is fixed on the end of the bracket-arm 10 and is adapted to indicate the fractions of a pound on the gear-wheel 11. A smaller toothed wheel 14 is journaled on the end of a bracket-arm 15, fixed on the cylinder, and is graduated into twenty parts, as shown. A tooth 16 is fixed on the face of the gear-wheel 11 and is adapted to engage the teeth formed on the periphery of the wheel 14. The fixed index-hand 13 also serves to indicate upon the wheel 14 the number of pounds registered. The said hand therefore serves the double purpose of indicating upon the wheel 14 the number of units of measurement and upon the wheel 11 the number of fractional parts of a unit of measurement.

In operation the material is placed in bulk in a bin or tank 17, formed on the top of the hopper 2, and feeds down into the cylinder by gravity. By turning the crank 8 the worm is rotated in the cylinder and operates to force the material forward in a uniform manner toward and out the discharge-spout 3. In practice the worm is formed of such pitch and size that a given number of turns will measure and discharge exactly one pound of material—such as coffee, for example. Let it be assumed that four complete revolutions of the worm will measure and discharge exactly one pound of coffee, then the gear-wheel 11 will be made four times the size of the pinion 7, so that when the worm has been rotated four times to measure and discharge a pound of coffee the gear-wheel 11 will be rotated once and will indicate one pound on its graduated face; but should the worm be rotated but once, the gear-wheel 11 will then be turned but one-fourth of a revolution and will indicate the number "5" or five-twentieths or one quarter of a pound. At the end of each complete rotation of the gear-wheel 11 the tooth 16 will engage the teeth of the wheel 14 and turn said wheel a distance equal to one tooth and will indicate on the graduated face of the wheel 14 one pound. The wheels 11 and 14 being graduated into twenty divisions, as before described, the wheel 11 will indicate measurements from one-twentieth of a pound up to a pound and the wheel 14 from one pound to twenty pounds.

By mounting the wheel 11 on a pivoted bracket-arm, as described, should it become necessary to set or change the wheel 11 it is merely necessary to raise the bracket-arm up, and thus throw the wheel 11 out of engagement with the other two wheels, when it can be freely rotated as desired.

By making the cap 4 removable access may be had to the interior of the cylinder for cleaning or repairing the parts.

By means of the device constructed in the manner above described the materials may be stored in bulk and are at all times instantly ready for measuring. The materials may be automatically measured and discharged in any given quantities with despatch and accuracy and without liability of waste and the measurements be automatically indicated.

Having described my invention, what I claim is—

In a measuring and registering machine, the combination with a cylinder, having openings for supplying the material to be measured thereto, and for discharging it therefrom, a feed screw or worm extending through said cylinder and means for operating it, and a pinion secured to said screw or worm, of a forked support, a pivoted bracket-arm adapted to rest upon said support between the branches of the fork thereon, and a graduated gear-wheel carried by said arm and adapted to mesh with said pinion, as and for the purpose set forth.

In testimony whereof I have hereunto set my hand in presence of two subscribing witnesses.

EDWARD S. CLAYTON.

Witnesses:
   K. L. JONES,
   W. C. McCRORY.